Figure 1:
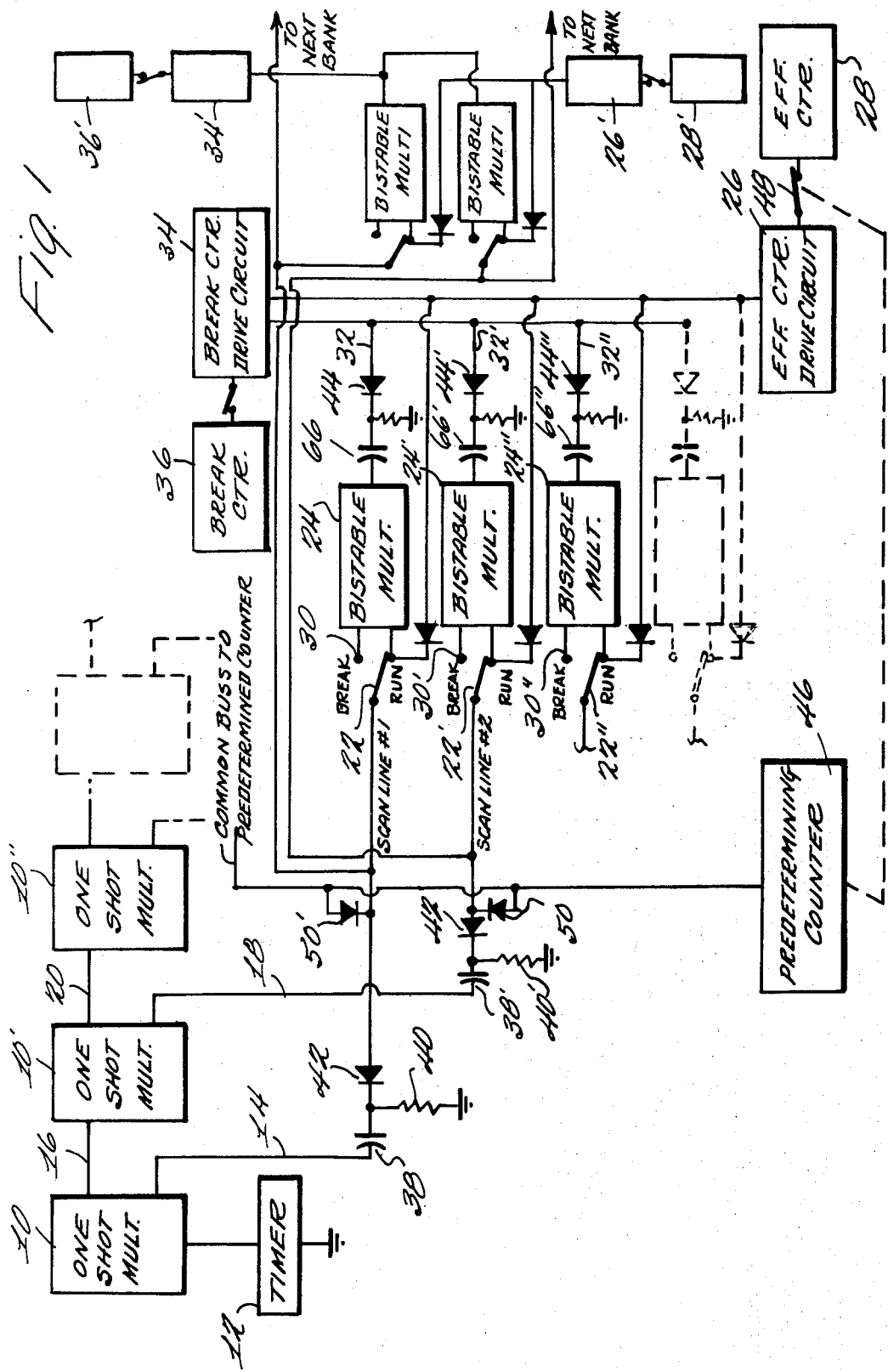

United States Patent [19]
Neill et al.

[11] 3,832,531
[45] Aug. 27, 1974

[54] OPERATION MONITORING SYSTEM

[75] Inventors: Henry R. Neill, Clarksville; Robert G. Davies, Boydton, both of Va.

[73] Assignee: Burlington Industries, Inc., Greensboro, N.C.

[22] Filed: Dec. 6, 1971

[21] Appl. No.: 205,101

Related U.S. Application Data

[62] Division of Ser. No. 1,814, Jan. 9, 1970, Pat. No. 3,660,972.

[52] U.S. Cl. ........ 235/92 PD, 235/92 R, 235/92 ST
[51] Int. Cl. ............................................ H03K 21/36
[58] Field of Search .................... 235/92 PD, 92 ST

[56] References Cited
UNITED STATES PATENTS
| | | | |
|---|---|---|---|
| 2,790,602 | 4/1957 | Jeppson | 235/92 R |
| 2,831,635 | 4/1958 | Strandberg | 235/92 R |
| 3,629,559 | 12/1971 | Cassaday | 235/92 PD |
| 3,648,026 | 3/1972 | Abe | 235/92 PD |

*Primary Examiner*—Paul J. Henon
*Assistant Examiner*—Robert F. Gnuse
*Attorney, Agent, or Firm*—Cushman, Darby & Cushman

[57] ABSTRACT

An operation monitoring system which may be adapted for use to monitor numerous types of operations and which is applicable to the monitoring of multi-spindle textile winding operations. The system is adapted to determine the efficiency of the operation and to count the number of unscheduled events which occur, such as yarn breaks in the multi-spindle textile winding operation. Scan pulse providing means produce a series of pulses which are registered by an efficiency counter when the operation is proceeding in a normal manner and a second counter registers the number of unscheduled events or yarn breaks which occur.

5 Claims, 2 Drawing Figures

3,832,531

OPERATION MONITORING SYSTEM

This is a division, of application Ser. No. 1,814 filed Jan. 9, 1970, now U.S. Pat. No. 3,660,972.

The present invention relates to operation monitoring systems and more particularly to a system which may be used for monitoring the operation of a multi-spindle textile winding frame to determine the efficiency of the operation and to determine the number of yarn breaks which occur.

The general purpose of this invention is to provide an operation monitoring system which can be readily adapted to measure the efficiency of various types of operation and which also is capable of determining the number of unscheduled events which occur during the operation. One particular adaptation of this system is with respect to the measurement of the efficiency of a multi-spindle textile winding operation whereby the number of breaks in the yarn is also determined for wage incentive programs. This invention reduces the chance for operator error in recording unscheduled events and in the case of use with a multi-spindle winding frame is adaptable for use with almost all winding frames now known. Furthermore, this invention provides a solid state scanner which eliminates electro-mechanical relays and stepping switches and the concomitant size and mechanical problems which characterize such relays and stepping switches. In addition, this system is designed so that a switch associated with a spindle, for example, can be tampered with in an effort to falsify data to no avail because the movement of the switch between scan pulses thereto has no effect on the data recorded. As an example, each spindle and its associated switch may be scanned once every seventeen seconds by a .75 second pulse. Any effort to falsify information by movement of the spindle switch would have to be precisley timed to the second. Because a machine operator does not know when a particular spindle is being scanned it is very difficult to falsify data.

An object of the present invention is the provision of an operation monitoring system which accurately determines the efficiency of an operation and which also determines the number of unscheduled events which occur during the operation and which detract from the efficiency thereof.

Another object is to provide a system for monitoring the operation of a multi-spindle textile winding frame to determine the efficiency of the operation and the number of yarn breaks which occur.

Figure 2:
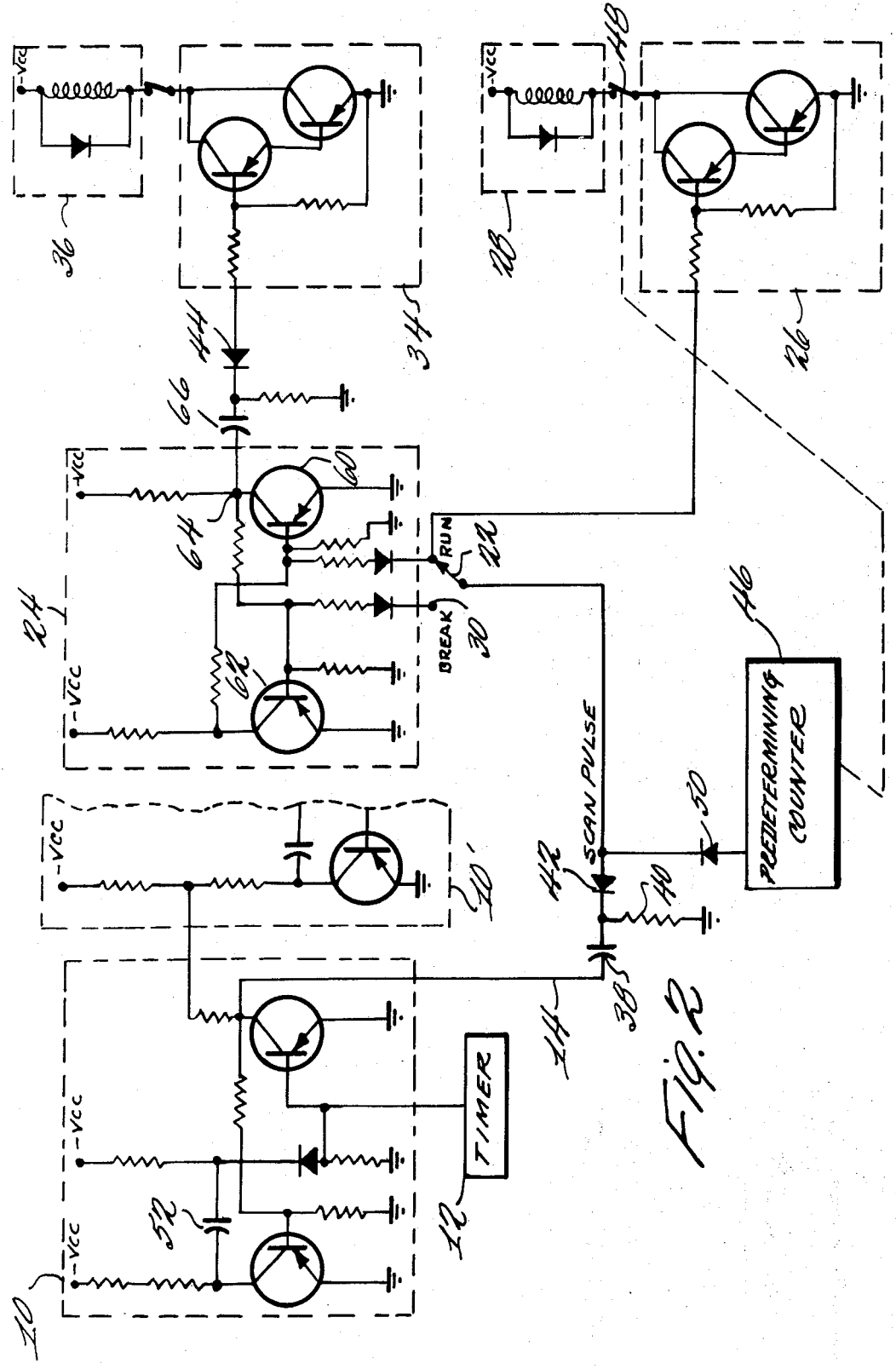

Other objects, features and advantages of the invention will become apparent to those of ordinary skill in the art as the disclosure is made in the following description of a preferred embodiment of the invention as illustrated in the accompanying drawings in which:

FIG. 1 is a block diagram view of the invention wherein a multi-point operation is monitored to determine the efficiency thereof and to determine the number of unscheduled events which occur during the operation; and FIG. 2 is a schematic diagram showing a portion of the system of FIG. 1 in more detail.

With reference now to the drawings, wherein like reference characters designate like or corresponding parts throughout the several views, there is shown in FIG. 1 a plurality of one-shot multivibrator circuits 10, 10', 10'', etc. or means for providing a series of scan pulses of predetermined length and repetition rate. When this monitoring system is used in conjunction with a multi-spindle textile winding frame one of the one-shot multivibrator circuits 10 is associated with each of the spindles in a designated bank or banks of spindles of the winding frame. Although the discussion herein with respect to the invention is directed to the use of the invention with such a multi-spindle textile winding frame it should be clearly understood that the monitoring system has numerous other applications in the monitoring of various types of operations other than textile winding operations.

A timer 12 is coupled in circuit with one of the one-shot multivibrator circuits 10. The output of this one-shot circuit is coupled to the input of the next one-shot circuit 10', for example, and this arrangement of one-shot circuits continues to the last such circuit. Thus, when the timer is activated the first one-shot circuit 10 is triggered which produces an output pulse of predetermined duration on the line 14. An output pulse is simultaneously produced on the output 16 which causes an output pulse to be generated on the outputs 18 and 20 of the on-shot circuit 10'. This process continues with each of the one-shot circuits 10 being sequentially triggered to produce output pulses until the last one-shot circuit has been activated. At this point, the series of scan pulses on lines 14, 18, etc. will again be initiated by the action of timer 12 which can be set in a conventional manner to provide any desired repetition rate.

The output 14, as one example, is coupled to switch means 22. A similar arrangement exists with respect to the output 18 and switch 22' and each of the one-shot circuits 10 is similarly connected to a respective bistable circuit means or bistable multivibrator circuit 24, 24', 24'', etc. The switches 22 are normally in a first or run condition or position, as illustrated in FIG. 1, whereby the series of scan pulses produced by the one-shot circuits 10 are conducted through the respective switches and on to information providing means or first counter drive circuit 26 and first counter or efficiency counter 28.

Each of the switches 22 are capable of being placed into a second condition or position as diagrammatically illustrated by terminals 30, 30', 30'', etc. in FIG. 1. When the monitoring system is utilized with a multi-spindle textile winding frame each of the switches 22 may be associated with drop wires well known in the art, which in turn are carried by the respective yarns at the respective spindle positions. When a yarn break occurs the drop wires (not shown) fall so that a circuit is completed and the switches 22 are moved from the first or run position to the second or break position in contact with the terminals 30. The bistable multivibrator circuits 24 are provided with outputs 32, 32', 32'', etc. which are coupled to event determining means or second counter drive circuit 34 and second or break counter 36. Each of the output pulses from the respective one-shot circuits 10 passes through a pulse forming circuit which includes, for example, a capacitor 38 and a resistor 40. In addition, an isolation diode 42, 42', etc. is respectively connected between each of the one-shot circuits 10 and each of the switches 22 while additional pulse forming circuits and isolation diodes 44 are provided between the bistable multivibrator circuits 24 and the second counter driver circuit 34.

A predetermining counter 46 may be coupled in circuit with respect to the outputs of the one-shot multivibrator circuits 10 and may be linked to a switch 48 located between the first counter drive circuit 26 and the first counter 28. A plurality of isolation diodes 50 are connected between the outputs of the one-shot circuits 10 and the predetermining counter 46. The predetermining counter operates to open the switch 48 and to disable the efficiency counter 28 when a predetermined number of the scan pulses is received by the predetermining counter.

With reference now to FIG. 2 wherein a portion of the system shown in FIG. 1 is illustrated in greater detail there is shown the one-shot multivibrator circuit 10 which includes a capacitor 52, the value of which controls the length of the scan pulses emanating from the one-shot circuit 10. If the monitoring system is in operation with respect to a multi-spindle textile winding frame the switch 22 is normally in the position shown so that the scan pulses from the one-shot circuit 10 pass through the switch 22 into the first counter driver circuit 26 and into the first counter 28. Only one efficiency counter is used for a bank of twelve spindles, for example, and, as illustrated in FIG. 1, each of the pulse outputs from the one-shot circuits 10, 10', 10'', etc. pass through the respective switches 22, 22', etc. and into the drive circuits 26 to register a count on the counter 28. As long as this normal condition of operation continues the transistor 60 in the bistable circuit 24 is on and the transistor 62 is off.

When a yarn break occurs at one of the spindles, for example at the spindle where switch 22 is located, the switch moves to complete a circuit to the base of transistor 62. Thus, when the scan pulse from the one-shot circuit 10 passes through the switch 22 it causes the base of transistor 62 to go more negative so that the transistor is turned on. This, in turn, turns off transistor 60 so that the voltage at point 64 quickly drops to a more negative value and the pulse created by this rapid change in voltage is passed by the capacitor 66 through the pulse forming circuit and diode 44 and into the second counter drive circuit 34 to register a count in the break counter 36. The transistor 62 then remains turned on as long as the switch 22 is in contact with the terminal 30 so that succeeding scan pulses from the output of one-shot circuit 10 do not register either on the counter 36 or on the counter 28 since the voltage at terminal 64 remains constant and the blocking capacitor 66 prevents the passage of current.

When the break is fixed the switch 22 is returned to the position illustrated in FIGS. 1 and 2 so that when the next scan pulse from one-shot circuit 10 arrives at the switch 22 it again turns on the transistor 60 and turns off transistor 62. Again, there is a rapid voltage change at terminal 64; however, this voltage change is in the positive direction and the diode 44 prevents this pulse from being transmitted to the drive circuit 34 and to the counter 36. Rather, the pulse is transmitted to the drive circuit 26 and ultimately to the efficiency counter 28. At this point, the operation continues with the scan pulses being registered in the efficiency counter 28 until another break occurs at which time the break counter 36 will register another pulse.

In order to facilitate the determination of the efficiency of the winding operation a predetermining counter 46 can be used. This counter can be set to a predetermined count which represents the number of pulses which the one-shot circuits 10, 10', 10'', etc. will produce over a predetermined time interval. This time interval may correspond to a normal working shaft.

Thus, the predetermining counter 46 will register each of the scan pulses received until the predetermined number of scan pulses is reached and at the time the counter will act to open switch 48 and to disable the efficiency counter 28. Thus, the efficiency of operation of the bank of spindles can readily be determined at the end of the shift by merely comparing the total number of counts present in the efficiency counter 28 and the total number of counts registered by the predetermining counter 46 during the shift. In practice, the predetermining counter can be set to open the switch 48 after a seven and one-half hour period or a little short of a total shift. This will enable the operator to read the efficiency counter prior to the end of the shift. However, the break counter 36 is preferably not disabled since the operator will be paid by the number of breaks which occur during the entire shift. The disabling of the break counter can be done in a conventional way, for example by merely opening a switch between the counter driver circuit 34 and the counter 36.

Thus, this invention provides for a highly effective monitoring system which provides needed data for wage incentive programs and which reduces the chances for operator error in recording unscheduled events or breaks in the case of textile winding operations. Furthermore, this invention provides for a solid state scanner which eliminates electro-mechanical relays and stepping switches and the disadvantages inherent in such mechanical arrangements. The monitoring system, although herein described with respect to a multi-spindle textile winding frame, can be readily utilized in monitoring the efficiency and the number of unscheduled events in any number of types of operations.

Obviously many modifications and variations of the present invention are possible in light of the above teachings. It is therefore to be understood that within the scope of the appended claims the invention may be practiced otherwise than as specifically described.

What is claimed is:

1. An operation monitoring system, comprising:
means for providing a series of scan pulses of predetermined length and repetition rate including a series of one-shot multivibrators coupled to each other to be sequentially triggered to provide said scan pulses and timer means electrically connected to said multivibrators for controlling the repetition rate of said pulses;
switch means in operative relationship with said scan pulse providing means for conducting said pulses and operative to be placed in a first or a second condition;
bistable circuit means in operative relationship with said switch means for being placed in a first conductive condition when said switch means is in said first condition and for being placed in a second conductive condition when said switch means is in said second condition;
means in operative relationship with said switch means for providing information to enable the determination of efficiency of said operation including a first counterdrive circuit and first counter means in circuit with said first counter drive circuit for counting the number of said scan pulses produced by said switch means when said switch means are in said first condition;

event determining means in operative relationship with said bistable circuit means for registering the occurence of an event in said operation when said switch means changes from said first to second condition including a second counterdrive circuit and second counter means in circuit with said second counter-drive circuit for counting the number of times said bistable circuit means changes from said first conductive condition to said second conductive condition; and third counter means in operative relationship with said scan pulse providing means and with said first counter means for disabling said first counting means when a predetermined number of said scan pulses is received by said third counter means.

2. A monitoring system as in claim 1 wherein said third counter means comprises:
   predetermining counter means.

3. A monitoring system as in claim 2 further including isolation means in circuit between said scan pulse providing means and said predetermining counter means for limiting the direction of flow of electrical current.

4. A monitoring system as in claim 1 wherein said bistable circuit means includes at least one bistable multivibrator normally in said first conductive condition.

5. A monitoring system as in claim 1 further including isolation means in circuit between said bistable circuit means and said second counter drive circuit for limiting the direction of flow of electrical current.

* * * * *